United States Patent [19]

Zollar et al.

[11] 4,082,677

[45] Apr. 4, 1978

[54] DRIED PHOSPHORIC ACID PRODUCT AND PROCESS

[75] Inventors: Leland H. Zollar, Fresno, Calif.; Edward W. Moore, Frontenac, Kans.

[73] Assignee: Harvest Industries, Inc., Los Angeles, Calif.

[21] Appl. No.: 445,274

[22] Filed: Feb. 25, 1974

[51] Int. Cl.$^2$ .............................................. C09K 7/00
[52] U.S. Cl. .................. 252/8.5 B; 423/317; 252/1; 426/807
[58] Field of Search ............... 252/8.5 B, 1; 423/317; 99/2 CD

[56] References Cited

U.S. PATENT DOCUMENTS

| | | | |
|---|---|---|---|
| 2,379,100 | 6/1945 | Partridge | 252/8.5 B |
| 3,048,471 | 8/1962 | Shaver | 252/8.5 B |

*Primary Examiner*—Stephen J. Lechert, Jr.
*Attorney, Agent, or Firm*—Rogers, Eilers & Howell

[57] ABSTRACT

A new dry phosphoric acid product and the process for making it are disclosed. The product is a dry finely divided, brown or black, charcoal-like, extremely hygroscopic powder having an effective phosphoric acid content of up to about 122.4% by weight (based on a 75% aqueous solution) a phosphorus content of up to about 29% by weight; and a moisture content usually less than 10% by weight, typically 3 to 8%. The product is useful as a source of phosphoric acid, and in combination, it produces a new animal feed ingredient material, a new drilling mud additive, and other novel products. The process comprises first mixing a phosphoric acid solution, such as 75 or 85% by weight phosphoric acid solutions of commercial grade, with a dry, relatively fine absorbent material, preferably an organic absorbent material such as peanut hulls, rice hulls, beet pulp or other inexpensive organic by-products, and then drying the mixture in conventional drying equipment, preferably at temperatures from 150° to 200° C. When organic absorbent carriers are used, the phosphoric acid and the heat of drying oxidize and dehydrate the organic materials so that the resultant dried product containing the dried phosphoric acid has the powdered, burnt or charcoal-like appearance.

30 Claims, 3 Drawing Figures

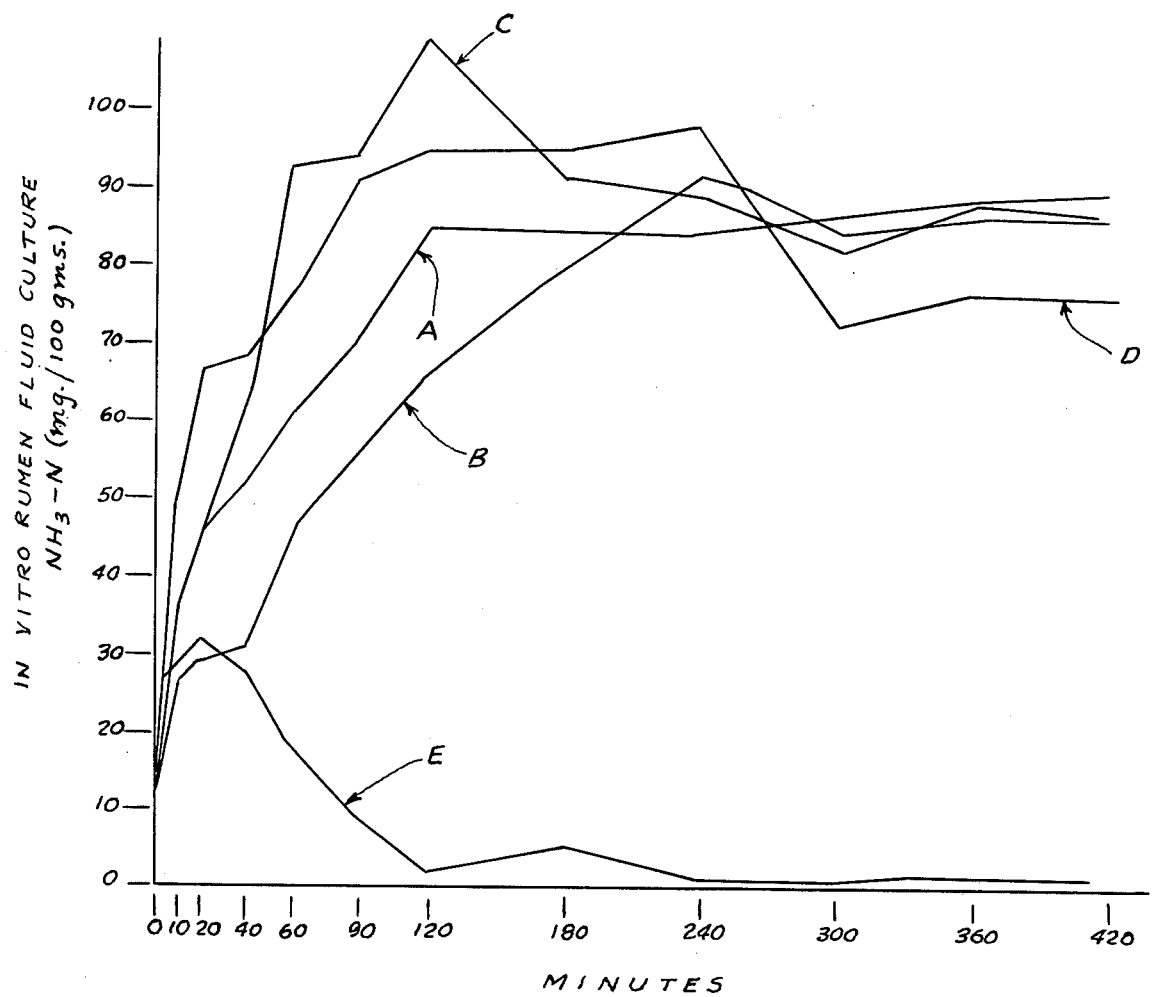

DRIED PHOSPHORIC ACID PRODUCT AND PROCESS

BACKGROUND OF THE INVENTION

Phosphoric acid as used analytically as a reagent chemical and is used commercially in a wide variety of processes, syntheses and operations. It is used as an acidulant in many chemical processes which require control of pH, for example, to control the pH in chemical reactions, in foods and in animal feeds.

Phosphoric acid is available commercially in liquid form typically in two strengths, 75% solution having a phosphorus content of 23.7% by weight and 85% solution having a phosphorus content of 26.8% by weight.

Due to the highly acidic nature of phosphoric acid solutions, all transport, storage and handling equipment using it must be of the type that is not susceptible to attack by the phosphoric acid, typically, either glass lined or stainless steel equipment. Also, great care must be used in handling it, lest the acid come in contact with some acid-vulnerable substances.

Moreover, since commercial phosphoric acid is very heavy (specific gravity 1.7 (85% solution) and is in aqueous solution, transportation costs are quite high, as the ultimate consumer must pay the additional cost of transporting the water in solution which does not normally contribute economically to the process in which the phosphoric acid is used.

SUMMARY OF THE INVENTION

Broadly stated, the present invention is a phosphoric acid product that, without sacrifice of its phosphoric acid properties, is dry, easy to handle, to contain, to ship and to use. More specifically, it is such a phosphoric acid product that is readily combinable into other products, particularly a drilling mud and an animal feed. Hence two other aspects of this invention are a new drilling mud additive and a new animal feed ingredient.

It is thought that the components of the product in its primary form, are at least largely dehydrated phosphoric acid and carbon in reduced form.

The product of this invention is a readily handled dry, finely divided, hygroscopic powder typically resembling charcoal in appearance, that can be transported, packaged and stored in inexpensive packing materials, for example, paper bags and fiber drums that have been treated or lined to provide a moisture barrier film which is not subject to attack by acid. Being dry, the product is easier to handle than liquid phosphoric acid, and even if spilled onto reactive materials, can rather readily be cleaned off before damage occurs. It is believed that the phosphoric acid product produced is in the form of dry orthophosphoric acid crystals which have been seeded within the dehydrated organic matrix as a result of the heat and evaporation of the moisture of the aqueous phosphoric acid solution.

Applicants have discovered a method of eliminating and minimizing the water of solution, which is normally present in standard aqueous solutions of commercial grades of phosphoric acids, and has produced a new dry phosphoric acid compound having the equivalence of up to 122.4% of a 75% aqueous solution of phosphoric acid.

Applicant's dried phosphoric acid product is made by sorbing (absorbing or adsorbing) a solution of phosphoric acid into an organic carrier and drying the carrier containing the phosphoric acid solution in conventional driers to a particulate solid material having a moisture content of below about 10% by weight, typically and preferably on the order of 3 to 8% by weight. Drying is preferably conducted at a temperature of between about 150° to 200° C, in order to maintain the acid in its usually preferred ortho state, but temperatures above and below that limit have been found to be effective. The organic carriers may be a variety of readily available and inexpensive absorbent materials such as those found as by-products in the food industry and include soy hulls, peanut hulls, rice hulls, wheat bran, beet pulp, citrus pulp, soybean meal, cottonseed meal, pulverized corn, starch, sawdust and like materials. A dry phosphoric product can be produced to have an upper limit of phosphorus content of about 29% by weight, and a phosphoric acid equivalency up to a theoretical limit of about 122.4%. The phosphoric acid is normally added to the carrier in a ratio of from about 5 to 1 to 1 to 1 and mixed, though ratios of from 1/10 to 10/1 or more may be used, and the resulting mixture or slurry is then fed to the drying device. The heat of drying and phosphoric acid rapidly oxidize the organic carrier, splitting off water and carbon dioxide from the organic material and oxidizing the substrate to from a scorched brown to a black charcoal-like powder, which remains in the mix. As the heat of drying continues to drive off water and carbon dioxide, the mix becomes a dried finely granulated, dry, hygroscopic powder.

The dry phosphoric acid can be used for any purpose for which liquid phosphoric acid solutions may normally be used if a slight solid residue is not objectionable. In many applications, the residue of the carrier present in the finished product is of no concern, it being noted that carbon is not reactive in many environments, or if reactive, the carbon does not react in a harmful way. If the solid residues are objectionable, the product can be readily reconstituted in situ by mixing with water to form an aqueous solution and allowing the solid residue to separate out at the bottom or by filtering off the residue, e.g., under vacuum. The resulting product can be used in any application for which phosphoric acid solutions may be used, including food uses, animal feed uses, preservation of silage, acidulants in chemical processing and in a wide variety of other uses.

Applicants have discovered two especially significant uses for this product. The dried phosphoric acid material is particularly useful as an oil well drilling mud component, wherein it is a pH control agent and thinning agent to control the viscosity, flow and working properties. Applicants have also discovered that the new phosphoric acid product is useful as a component of animal feed, especially for ruminants, wherein it is for controlling pH in rumen fluid, particularly when used in cooperation with sources of non-protein nitrogen such as urea, to counteract excessive ammonia build-up in the animal's stomach system. Non-protein nitrogen (NPN), such as urea, is fed to ruminant animals as a source of crude protein. When the dehydrated phosphoric acid of applicants' invention is used in animal rations, it is preferably produced at drying temperatures of between about 150°–200° C, since it is about 150° C that orthophosphoric acid becomes anhydrous and at temperatures above about 200° C, orth-phosphoric acid is converted into the form of pyrophosphoric acid. The phosphorus in pyrophosphoric acid is not as readily available for animal nutrition as is the phosphorus in orthophosphoric acid. Pyrophosphoric acid does provide a source of nutrient phosphorus, however.

DESCRIPTION OF THE DRAWINGS

FIG. 2 is a graph showing the effectiveness of applicants' dehydrated phosphoric acid in controlling the ammonia content and time of release of ammonia in rumen fluid.

DESCRIPTION OF THE PREFERRED EMBODIMENTS

Figure 1:
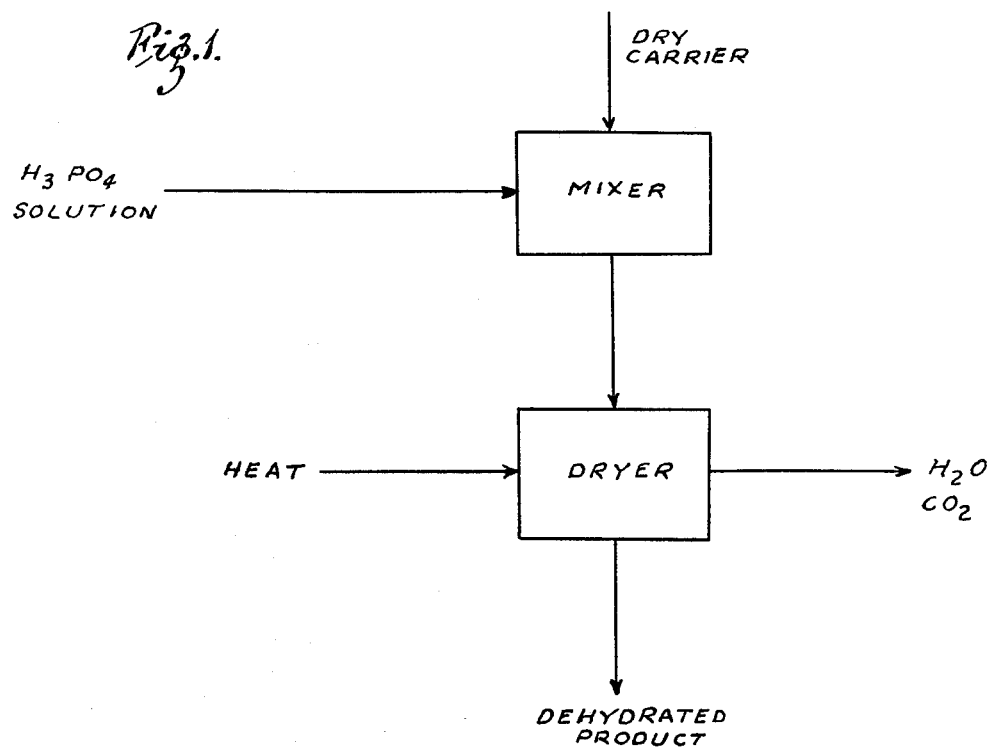
FIG. 1 is a schematic flow sheet showing the steps in the process of manufacturing the powdered phosphoric acid product of the invention.

The following examples are included to illustrate applicants' method of producing the new dehydrated phosphoric acid product and to illustrate methods of using the dehydrated phosphoric acid product. A variety of processes and uses including oil well drilling muds and uses to control pH, ammonia release and time of ammonia release in rumen fluid are demonstrated. It will be appreciated that the following examples are merely illustrative and summarize and exemplify the wide spectrum of experiments which have been conducted. One skilled in the art would recognize that the parameters illustrated here could be combined in a variety of modes and still fall within the concept disclosed in applicants' specification.

EXAMPLE I

A dehydrated phosphoric acid product according to one aspect of the invention was prepared by mixing 2.4 parts by weight of a 75% aqueous solution of phosphoric acid to 1 part by weight of air dry peanut hulls. The ingredients were mixed thoroughly and then dried for 3 hours in an electric, hot, still air oven at a temperature of between 240°–260° F. (115°–127° C). As the mix was heated and drying progressed, the color changed from a light brown to black. During the drying process the mix first became a wet slurry before beginning to dry. The mix was also stirred occasionally to facilitate drying. The final dried product was a black, finely-divided powder upon being removed from the drying oven. The black powder recovered has a phosphoric assay of 22.6% by weight and had a phosphoric acid equivalency of 95% of a 75% aqueous solution of phosphoric acid.

EXAMPLE II

A dehydrated phosphoric acid product according to one aspect of the invention was prepared by mixing 3.5 parts by weight of a 75% aqueous solution of phosphoric acid with 1 part by weight of air dry peanut hulls. The mix was dried under conditions similar to those of Example I above in the electric, hot, still air oven of Example 1 and a finely-divided black charcoal-like product was recovered. The product has a phosphorus assay of 24.7% by weight and has a phosphoric acid equivalence of 104% of a 75% aqueous solution of phosphoric acid.

EXAMPLE III

A dehydrated phosphoric acid product according to one aspect of this invention was prepared by mixing 2.45 parts by weight of 75% aqueous solution of phosphoric acid with 1 part by weight of air dry rice hulls. The mix was dried as described in Example I in the electric, hot, still air oven and a black finely-divided charcoal-like product was recovered. The product had a phosphorus assay of 22.0% by weight and had a phosphoric acid equivalence of 93% of a 75% aqueous of phosphoric acid.

EXAMPLE IV

A dehydrated phosphoric acid according to one aspect of the invention was prepared by mixing 3.6 parts by weight of 75% aqueous phosphoric acid solution with one part by weight of air dry peanut hulls. The mix was then fed into a gas fired rotary drum dryer where, as heating to 280°–300° F occurred, the mix turned to a black aqueous slurry. As the process progressed and the slurry moved through the drying unit, the water was evaporated and a fine black charcoal-like powder was exhausted from the dryer by the air flow and collected by a cyclone separator. The recovered black charcoal-like powder had a moisture content of 3–4% by weight, a phosphorus assay of 20.1–22.9% by weight, and a phosphoric acid equivalence of 89–97% of a 75% aqueous phosphoric acid solution.

EXAMPLE V

A dehydrated phosphoric acid product according to one aspect of this invention was prepared by blending 3.6 parts by weight of 75% phosphoric acid solution with one part by weight, sawdust and wood shavings. The mix was then placed on a hot plate for heating. It was stirred constantly, first changing to an aqueous black slurry, then to a uniform black particulate mass. The black particulate mass was then dried in the electric, hot, still air oven of Example I at a temperature of 150°–170° C. The recovered product was in the form of a finely-powdered black charcoal-like material. The product was assayed to contain 25.1% by weight phosphorus and had a phosphoric acid equivalence of 106% of a 75% aqueous solution of phosphoric acid. The product had a moisture content of 2.9% by weight.

EXAMPLE VI

A second dehydrated phosphoric acid product similar to that of Example V was prepared by blending 4.1 parts by weight of 75% phosphoric acid solution with 1 part by weight sawdust and wood shavings and the product was dried as described in Example 1. The recovered product had a phosphorus assay of 25.3% by weight and a moisture content of 5% by weight. The product had a phosphoric acid equivalence of 106% of a 75% aqueous phosphoric acid solution.

EXAMPLE VII

A dehydrated phosphoric acid product according to one aspect of the invention was prepared by blending 4.1 parts by weight of 75% phosphoric acid solution and 1 part by weight sawdust and wood shavings. The mix was dried in the dryer of Example IV at a temperature between 150°–200° C and a finely-divided black charcoal-like product was recovered. The product had a moisture content between 3–8% by weight and an assay for phosphorus of between 24–25.8% by weight. The product had a 75% aqueous solution phosphoric acid equivalence of between 101 to 109%. This product was made in a large production run using 1992 pounds of starting materials with a yield of product calculated to be about 1600 pounds of finished material. Approximately 800 pounds of final product were recovered from the process. The 800 pounds excess shrink of the material was the result of destruction of a portion of the organic absorbent by the phosphoric acid and heat, loss of more moisture from the product than had been calculated, and poor product recovery. On shutdown, it was discovered that well over 300 pounds of product had remained in the equipment.

EXAMPLE VIII

As a result of the large shrink experienced in the process described in Example VII, a bench test was conducted to determine the actual amount of shrink resulting from loss of moisture and absorbent destruction in the process. The same formula was used as that described above in Example VII except the process was conducted on bench type equipment in small quantities. The resulting product was dried to a zero moisture content as determined by a moisture procedure using 100° air oven and was assayed to contain 25.8% phosphorus by weight and had a 75% phosphoric acid equivalence of 109%. The total shrink in the product was 27.3%.

Applicants' dehydrated phosphoric acid has been found to be particularly useful as an additive in oil well drilling muds. Oil drilling muds are sensitive to metallic ions, such as magnesium and calcium, which increase the viscosity of the mud. High viscosity results in increased pumping cost, poor lubrication, and unsatisfactory drilling performance. Conventional mud thinning additives, such as tannins, sodium tetraphosphate (STP), sodium metaphosphate (SMP), sodium pyrophosphate (SAPP) and sodium orthophosphate (TSP), control viscosity by adjusting the pH of the mud and by sequestering unwanted hardness. These additives are easy to use, since they are solids, but due to their buffering properties (SAPP pH 4.0, STP ph 7.0) greater quantities are needed, particularly if pH control is needed and sequestration. Applicants' solid acid is more effective, since the orthophosphate form is the most effective as a sequestering agent and the acid supplies a greater number of hydrogen ions than the conventional salts. Applicants' product is also in the convenient to use solid form. Applicants have found that from 0.15 to 0.4 pounds per barrel of their dehydrated phosphoric acid (100% by weight equivalence based on a 75% aqueous $H_3PO_4$ solution) per c.c. of mud alkalinity is effective to control excess alkalinity, hardness, and pH. The mud pH is normally controlled to between about 8.0 and 11.5. Preferred ranges are from about 8.0 to 9.5 for low pH muds and from about 11 to 11.5 for high pH muds.

EXAMPLE IX

The dehydrated phosphoric acid produced in Example VII above was used to regulate alkalinity, hardness and act as a thinning agent in oil well drilling muds. A test was made using the dehydrated phosphoric acid in a lime base drilling mud having a hardness (calcium level) of about 450–500 parts per million and having an alkalinity of 1.3 cc per barrel. The dehydrated phosphoric acid was added at a level of 0.4 pounds dehydrated phosphoric acid per barrel of drilling mud. After the addition, the hardness level dropped to about 240 parts per million and the alkalinity was reduced from 1.3 cc. down to 0.4 cc. very quickly. The pH was reduced from a very high level (above 12) at the time of initiation of the trial to about 11.5 in about thirty minutes. After completion of the addition of the dehydrated phosphoric acid, the pH had dropped to between 10.5 to 11.0 (about 60 minutes). The pH was determined by using a litmus paper test strip. The performance of the drillng mud and the control of the viscosity and drilling properties of the fluid were judged to be quite satisfactory. The control of alkalinity, hardness and pH in the lime base were judged to be quite satisfactory in this type of service.

EXAMPLE X

A test similar to Example IX was conducted on an oil well drilling mud having a bentonite (sodium montmorillonite) base using 0.15 pounds dehydrated phosphoric acid per barrel of drilling mud per each cc of alkalinity. Viscosity and drilling properties of the mud were judged to be quite satisfactory and the control of hardness by precipitation of calcium and the control of pH were quite satisfactory. Excessive viscosity and gelling of the drilling mud was avoided and the drilling mud performed quite satisfactorily in service.

In ruminant animals, bacteria, which are normally present in the rumen, hydrolize proteins and non-protein nitrogen to ammonia. The ammonia is absorbed and utilized by the bacteria to form proteins which can be subsequently digested and utilized in the abomasum of the animal. However, non-protein nitrogen, such as urea, is normally hydrolized to ammonia much more rapidly than the bacteria present in the rumen can utilize it, creating a very rapid build up to very high levels of ammonia within the rumen. Concurrent with build up of ammonia to high levels in the rumen, the ammonia is absorbed into the blood stream of the animal directly from the rumen. The ammonia absorption creates toxicity and frequently results in death of the animal. It is known that the pH in the rumen greatly influences the rate of hydrolysis of urea to ammonia and the rate of ammonia absorption from the rumen into the blood stream. The lower the pH of the rumen, the slower the hydrolysis and the slower the absorption into the blood stream. Phosphoric acid has the ability to lower the pH in the rumen, thereby reducing the rate of hydrolysis of urea to ammonia and reducing the rate of absorption of ammonia into the blood stream. The dehydrated phosphoric acid produced by applicant has a special advantage as an animal feed ingredient in that it is inexpensive, is easily stored and transported and may be used for purposes other than as a ruminant feed ingredient. It may also be used to supply phosphorus in a very pure and highly available form to all classes of animals by inclusion in their rations.

Example XI

The dehydrated phosphoric acid produced by the method of Example IV was used as a pH control agent in rumen fluid in which rations containing urea as a source of non-protein nitrogen supplementation were tested. Samples were prepared in an artificial rumen using fresh rumen fluid obtained from a fistulated steer and a variety of rations utilizing urea as a source of non-protein nitrogen were tested. The rations were formulated to be equivalent in total nitrogen and caloric content. The rations were formulated as follows:

| A. | Urea phosphate (H. J. Baker & Company) | | 3.2398 | grams |
|---|---|---|---|---|
| | Pulverized corn | | 8.3264 | grams |
| | | Total weight | 11.5662 | grams |
| | | Total nitrogen | .675017 | grams |
| B. | Pulverized corn | | 8.3264 | grams |
| | Urea (45% nitrogen) | | 1.1843 | grams |

|   |   |   |   |
|---|---|---|---|
|   | Dehydrated phosphoric acid of Example IX | 1.5885 | grams |
|   | Total weight | 11.0991 | grams |
|   | Total nitrogen | 0.665122 | grams |
| C. | Urea | 1.1843 | grams |
|   | Pulverized corn | 8.3264 | grams |
|   | Total weight | 9.5107 | grams |
|   | Total nitrogen | .665122 | grams |
| D. | "Starea" 44 obtained from Farmarco, Inc. bearing U.S. Pat. No. 3,642,489 | 9.75995 | grams |
|   | Total nitrogen | .665238 | grams |
| E. | 44% protein soybean meal | 8.9031 | grams |
|   | Total nitrogen | 0.66524 | grams |

Figure 3:
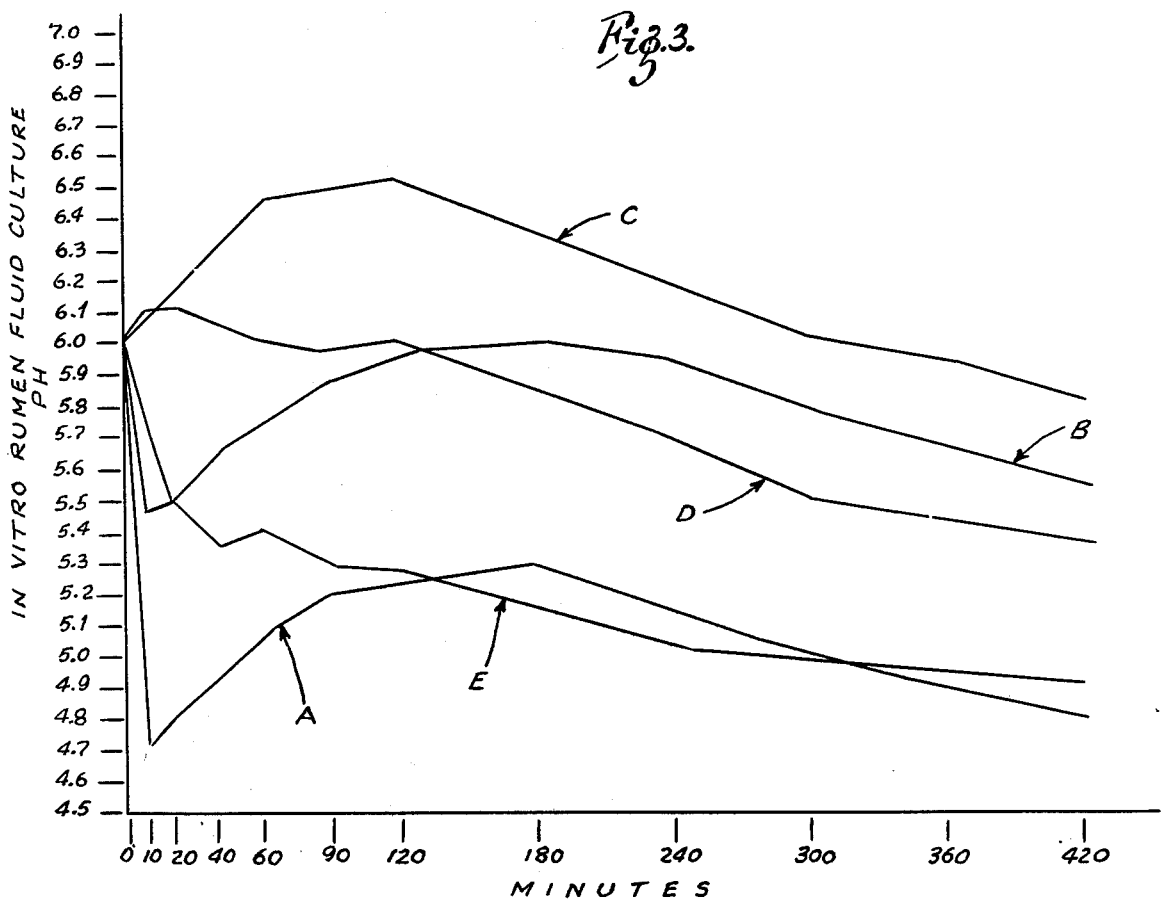
FIG. 3 is a graph showing the pH of the rumen fluid concurrent with the ammonia content and release rates shown in FIG. 2 from a variety of crude protein sources.

Samples A through E were tested in the artificial rumen for a 7-hour period and the rate of ammonia release and duration was recorded. The pH of the rumen fluid concurrent with the ammonia level in relation to time was also recorded. The nitrogen release data are shown in FIG. 2 are adjusted to depict comparative curves based on a uniform starting point and the pH data are shown in FIG. 3. The pH of the rumen fluid was adjusted to 6 prior to the initiation of each test.

The interpretation of the results shown in the graph of FIG. 2 is as follows: the lower the peak in ammonia concentration and the later the time at which the peak in the curve comes, the better the product performance, indicating that with slower release, better efficiency of utilization would be possible. In conjunction with a relatively low pH, there would be less absorption of ammonia from the rumen into the blood stream resulting in less risk of toxicity to an animal. It was noted that sample B utilizing the dehydrated phosphoric acid in combination with raw urea and pulverized corn resulted in a very late peak and had a relatively low peak in conjunction with a desirable pH curve. The slowed rate of urea hydrolysis as a result of the addition of dehydrated phosphoric acid may be especially noted by comparing the curve for that test sample B to the test sample C containing only pulverized corn and raw urea. Since the difference between the two samples was only the addition of dehydrated phosphoric acid, it was expected that the resulting slower rate of hydrolysis with a later ammonical nitrogen peak and a much lower pH curve were the results of addition of dehydrated phosphoric acid to the system.

Samples A and D are specialty products designed specifically for ruminant feeding and are limited to use in supplying crude protein in a feed formula. They cannot be used in combination with raw urea or are limited in the amount of urea which may be used in conjunction with them as is sample E. The dehydrated phosphoric acid of applicant's invention may be used with raw urea in a much more flexible combination because of the more concentrated acidic nature of the dehydrated phosphoric acid. The dehydrated phosphoric acid has the flexibility for applications in many situations other than strictly as a ruminant feed ingredient. It may be used to supply phosphorus in a very pure and highly available form to the animal consuming the ration in a non-protein nitrogen ration designed for ruminants or in other rations designed for other animals including monogastric animals.

EXAMPLE XII

The dehydrated phosphoric acid product according to one aspect of the invention was prepared by mixing 10.12 parts by weight dried raw starch with a solution of 1 part by weight, 75% aqueous solution of phosphoric acid and 4 parts by weight distilled water. The ingredients were mixed thoroughly and then dried for about 3 hours as described in Example I at a temperature between 150°-160° C. As the mixture dried, it changed from a white color to a light brown burnt color. The brown product was removed from the drying oven and collected. The recovered dry product had a phosphorus assay of greater than 3%, had an orthophosphorus assay of 3.12%, the product contained 3.12% water. When 1 gram of the product was added to 100 grams of water, the pH of the water was reduced to 3.8. The product had a phosphoric acid equivalency of about 13% of a 75% aqueous solution of phosphoric acid.

EXAMPLE XIII

The dehydrated phosphoric acid product according to one aspect of the invention was prepared by mixing 100 parts by weight sugar with 10 parts by weight 75% aqueous solution of phosphoric acid (boiling temperature). Five parts by weight distilled water was then added. The ingredients were mixed thoroughly and then dried for about 3 hours as described in Example I at a temperature between 150°-160° C. The recovered dry product had a phosphorus assay of 2.64%, had an orthophosphorus assay of 2.63%, the product contained 0.18% water. When 1 gram of the product was added to 100 grams of water, the pH of the water was reduced to 4.2. The product had a phosphoric acid equivalency of 11.1% of a 75% aqueous solution of phosphoric acid. The dried product absorbed 1.4% water when stored exposed to room temperature and humidity for 6 hours.

EXAMPLE XIV

The dehydrated phosphoric acid product according to one aspect of the invention was prepared by mixing 40 parts by weight soybean mill run, 77 parts by weight molasses, with 10 parts by weight 75% aqueous solution of phosphoric acid. The molasses was heated to 140°-150° F, the phosphoric acid was added to the molasses and thoroughly mixed. One half of the mix was then add to the soybean mill run, this was mixed and the rest of the molasses-acid blend and 5 parts by weight distilled water were added and mixed. The ingredients were mixed thoroughly and then dried for about 3 hours as described in Example I at a temperature between 150°-160° C. The recovered dry product had a phosphorus assay of 2.64%, had an orthophosphorus assay of 2.53%, the product contained 0.18% water. When 1 gram of the product was added to 100 grams of water, the pH of the water was reduced to 4.8. The product had a phosphoric acid equivalency of 11.1% of a 75% aqueous solution of phosphoric acid. The dried product picked up 1.39% water when stored exposed to ambient conditions for 6 hours.

EXAMPLE XV

A dehydrated phosphoric acid product according to one aspect of the invention was prepared by mixing 25 parts by weight Volclay ® sodium bentonite clay with 100 parts by weight 75% aqueous solution of phosphoric acid (boiling). The ingredients were mixed thoroughly and then dried for about 3 hours in an electric, hot, still air oven at a temperature between 150°-160° C as described in Example I. The recovered dry product had a phosphorus assay of 24.83% by weight, had an orthophosphorus assay of 24.75%, the product contained 1.23% water. When 1 gram of the product was added to 100 grams of water, the pH of the water was reduced to 3.2. The product had a phosphoric acid equivalency of 105% of a 75% aqueous solution of phosphoric acid. The dried product absorbed 6.72% water when stored exposed to ambient conditions for 6 hours.

EXAMPLE XVI

A dehydrated phosphoric acid product according to one aspect of the invention was prepared by mixing 25 parts by weight talc with 100 parts by weight 75% aqueous solution of phosphoric acid (boiling). The ingredients were mixed thoroughly and then dried for about 3 hours in an electric, hot, still air oven at a temperature between 150°–160° C as described in Example I. The recovered dry product had a phosphorus assay of 25.39%, had an orthophosphorus assay of 25.2%, the product contained 1.07% water. When 1 gram of the product was added to 100 grams of water, the pH of the water was reduced to 3.2. The product had a phosphoric acid equivalency of 107% of a 75% aqueous solution of phosphoric acid. The dried product absorbed 13.43% by weight water when stored exposed to ambient conditions for 6 hours.

EXAMPLE XVII

A dehydrated phosphoric acid product according to one aspect of the invention was prepared by mixing about 25 parts by weight powdered charcoal with 100 parts by weight 75% aqueous solution of phosphoric acid, the mixture was very wet and would not dry easily so additional charcoal was added to form an easily dried mixture. The ingredients were mixed thoroughly and then dried for about 3 hours at a temperature between 150°–160° C as described in Example I. The recovered dry product had a phosphorus assay of 20.33%, had an orthophosphorus assay of 20.2%, the product contained 3.11% water. When 1 gram of the product was added to 100 grams of water, the pH of the water was reduced to 3.2. The product had a phosphoric acid equivalency of 85% of a 75% aqueous solution of phosphoric acid. The dried product absorbed 12.9% by weight water when stored exposed to ambient conditions for 6 hours.

It will be understood by one skilled in the art that various changes or modifications may be made in addition to those described in the foregoing examples without departing from the scope of applicants' invention as defined in the following claims. It is intended that all matter which has been described in the foregoing specification shall be interpreted as being for purposes of illustration and not as limiting the invention claimed.

We claim:

1. A process of producing a dehydrated phosphoric acid compound comprising mixing an aqueous phosphoric acid solution and an absorbent organic carrier, dehydrating the mix, to form a dry, dehydrated phosphoric acid compound, and recovering the dried compound.

2. The method of claim 1 wherein the mix contains from about 1/10 to 10/1 parts by weight aqueous phosphoric acid solution on a 75% $H_3PO_4$ basis, per one part by weight sorbent organic carrier.

3. The method of claim 1 wherein the mix is dried at a temperature between about 150° to 200° C.

4. The method of claim 1 wherein the sorbent organic carrier is selected from the group consisting of soybean hulls, peanut hulls, rice hulls, wheat bran, beet pulp, citrus pulp, soybean meal, cottonseed meal, starch, pulverized corn, sugar, molasses, charcoal, sawdust and wood shavings.

5. The method of claim 1 wherein the absorbent organic carrier is oxidized to a fine, carbonaceous powder during the drying step.

6. A dry pulverulent phosphoric acid product having a sorbent, organic carrier and having the phosphoric acid impregnated into the carrier matrix.

7. The product of claim 6 wherein the product has a phosphoric acid equivalence of up to about 122.4% by weight based on the weight of a 75% aqueous phosphoric acid solution.

8. The product of claim 6 wherein the product has a moisture content between about 0 and 10% by weight.

9. The product of claim 6 wherein the product has a phosphorus content of up to about 29% by weight.

10. The product of claim 6 wherein the carrier is in the form of an oxidized, carbonaceous matrix.

11. A process of producing a dehydrated phosphoric acid which is readily rehydratable to orthophosphoric acid by reconstitution with water comprising mixing an aqueous phosphoric acid solution and an absorbent carrier, dehydrating the mix to form a dry phosphoric acid and recovering the dried compound.

12. The method of claim 11 wherein the absorbent carrier is an absorbent organic carrier.

13. The method of claim 11 wherein the mix contains from about 1/10 to 10/1 parts by weight aqueous phosphoric acid solution on a 75% $H_3PO_4$ basis, per one part by weight sorbent carrier.

14. The method of claim 11 wherein the mix is dried at a temperature between about 150° to 200° C.

15. The method of claim 11 wherein the sorbent carrier is selected from the group of sorbent organic carriers consisting of soybean hulls, peanut hulls, rice hulls, wheat bran, beet pulp, citrus pulp, soybean meal, cottonseed meal, starch, pulverized corn, sugar, molasses, charcoal, sawdust and wood shavings.

16. The method of claim 15 wherein the sorbent organic carrier is oxidized to a fine, carbonaceous powder during the drying step.

17. The method of claim 11 wherein the absorbent carrier is selected from the group consisting of clay and talc.

18. A dry pulverulent phosphoric acid readily reconstitutable in water having a sorbent carrier and having the phosphoric acid impregnated into the carrier matrix.

19. The product of claim 18 wherein the carrier is an organic carrier.

20. The product of claim 19 wherein the carrier is selected from the group consisting of soybean hulls, peanut hulls, rice hulls, wheat bran, beet pulp, citrus pulp, soybean meal, cottonseed meal, starch, pulverized corn, sugar, molasses, charcoal, sawdust and wood shavings.

21. The product of claim 20 wherein the carrier is selected from the group consisting of clay and talc.

22. The product of claim 18 wherein the product has a phosphoric acid equivalence of up to about 122.4% by weight based on the weight of a 75% aqueous phosphoric acid solution.

23. The product of claim 18 wherein the product has a moisture content between about 0 and 10% by weight.

24. The product of claim 18 wherein the product has a phosphorus content of up to about 29% by weight.

25. The product of claim 18 wherein the carrier is in the form of an oxidized, carbonaceous matrix.

26. The product of claim 18 wherein the phosphoric acid is readily reconstitutable or orthophosphoric acid.

27. A dry pulverulent phosphoric acid product, which can be reconstituted by water to orthophosphoric acid, having an oxidized carbonaceous matrix and dried orthophosphoric acid impregnated therein, the carbonaceous matrix being an oxidized absorbent organic carrier, the product having a moisture content of between about 0 and 10% by weight, a phosphorus content of up to about 29% by weight and an orthophosphoric acid equivalence of up to about 122.4% by weight based on the weight of a 75% aqueous phosphoric acid solution.

28. The product of claim 27 wherein the organic carrier is selected from the group consisting of soybean hulls, peanut hulls, rice hulls, wheat bran, beet pulp, citrus pulp, soybean meal, cottonseed meal, starch, pulverized corn, sugar, molasses, charcoal, sawdust and wood shavings.

29. A process of producing a dry pulverulant phosphoric acid product, which can be reconstituted by water to orthophosphoric acid, comprising mixing an aqueous phosphoric acid solution with an adsorbent organic carrier, drying the mix and oxidizing the carrier into a carbonaeous matrix having the dried orthophosphoric acid impregnated therein, the dried product having a moisture content between about 0 and 10% by weight, a phosphorus content of up to about 29% by weight, and an orthophosphoric acid equivalence of up to about 29% by weight based on the weight of a 75% aqueous phosphoric acid solution.

30. The process of claim 29 wherein the organic carrier is selected from the group consisting of soybean hulls, peanut hulls, rice hulls, wheat bran, beet pulp, citrus pulp, soybean meal, cottonseed meal, starch, pulverized corn, sugar, molasses, charcoal, sawdust and wood shavings.

* * * * *